(12) United States Patent
Ehmann et al.

(10) Patent No.: US 10,893,274 B2
(45) Date of Patent: Jan. 12, 2021

(54) METHOD FOR PROCESSING VIDEO SIGNAL ON BASIS OF ARBITRARY PARTITION TRANSFORM

(71) Applicant: LG Electronics Inc., Seoul (KR)

(72) Inventors: Jana Ehmann, San Jose, CA (US); Onur G. Guleryuz, San Jose, CA (US)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/301,065

(22) PCT Filed: May 12, 2017

(86) PCT No.: PCT/KR2017/004949
§ 371 (c)(1),
(2) Date: Nov. 13, 2018

(87) PCT Pub. No.: WO2017/196127
PCT Pub. Date: Nov. 16, 2017

(65) Prior Publication Data
US 2019/0191166 A1    Jun. 20, 2019

Related U.S. Application Data

(60) Provisional application No. 62/335,621, filed on May 12, 2016.

(51) Int. Cl.
*H04N 19/13* (2014.01)
*H04N 19/129* (2014.01)
*H04N 19/60* (2014.01)
*H04N 19/124* (2014.01)
*H04N 19/176* (2014.01)

(52) U.S. Cl.
CPC .......... *H04N 19/13* (2014.11); *H04N 19/124* (2014.11); *H04N 19/129* (2014.11); *H04N 19/176* (2014.11); *H04N 19/60* (2014.11)

(58) Field of Classification Search
CPC ... H04N 19/105; H04N 19/119; H04N 19/129
USPC ..................................... 375/240.02
See application file for complete search history.

(56) References Cited

U.S. PATENT DOCUMENTS

2012/0236931 A1   9/2012  Karczewicz et al.
2014/0211039 A1   7/2014  Herman et al.

FOREIGN PATENT DOCUMENTS

KR   1020110116025   10/2011
KR   101298598       8/2013
KR   101541945       8/2015

*Primary Examiner* — Dominic D Saltarelli
(74) *Attorney, Agent, or Firm* — Fish & Richardson P.C.

(57) ABSTRACT

Provided is a method for processing a video signal on the basis of an arbitrary partition transform, the method comprising the steps of: determining a partition set for input data, the partition set indicating a set of partitions divided from a data block on the basis of a scanning pattern; determining a transform matrix set corresponding to the partition set; obtaining an arbitrary partition transform vector for each partition by applying the transform matrix set to the partition set; and obtaining the arbitrary partition transform coefficient for the input data by inverse-mapping the arbitrary partition transform vector.

12 Claims, 13 Drawing Sheets

[FIG. 1]
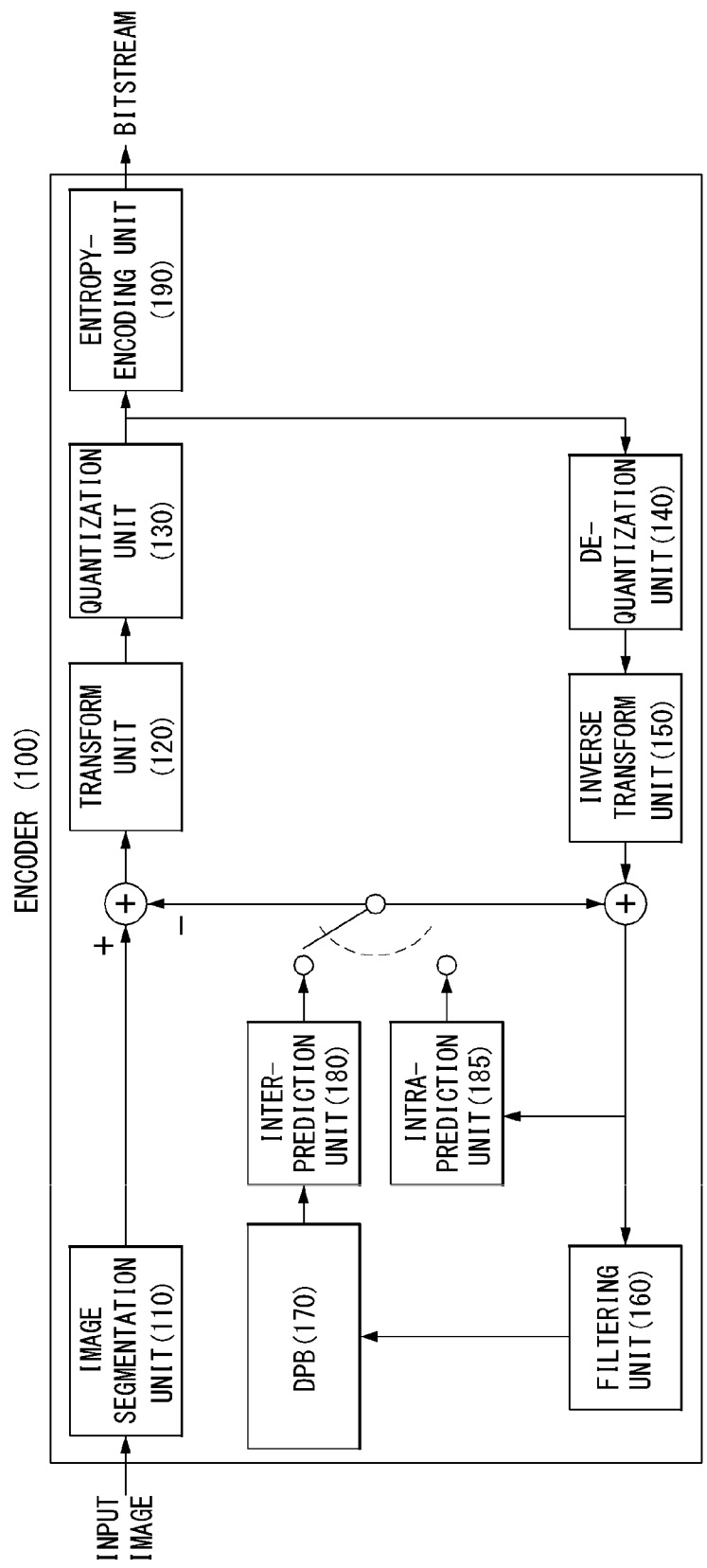

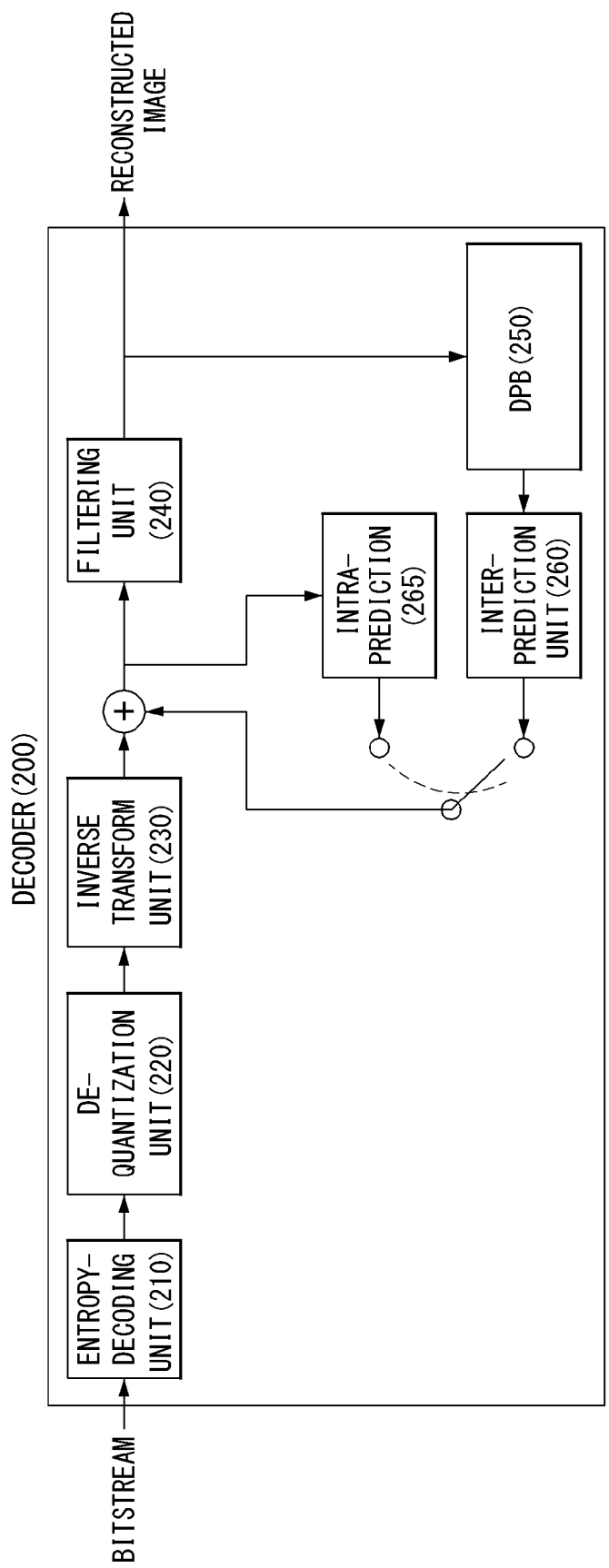

[FIG. 3]
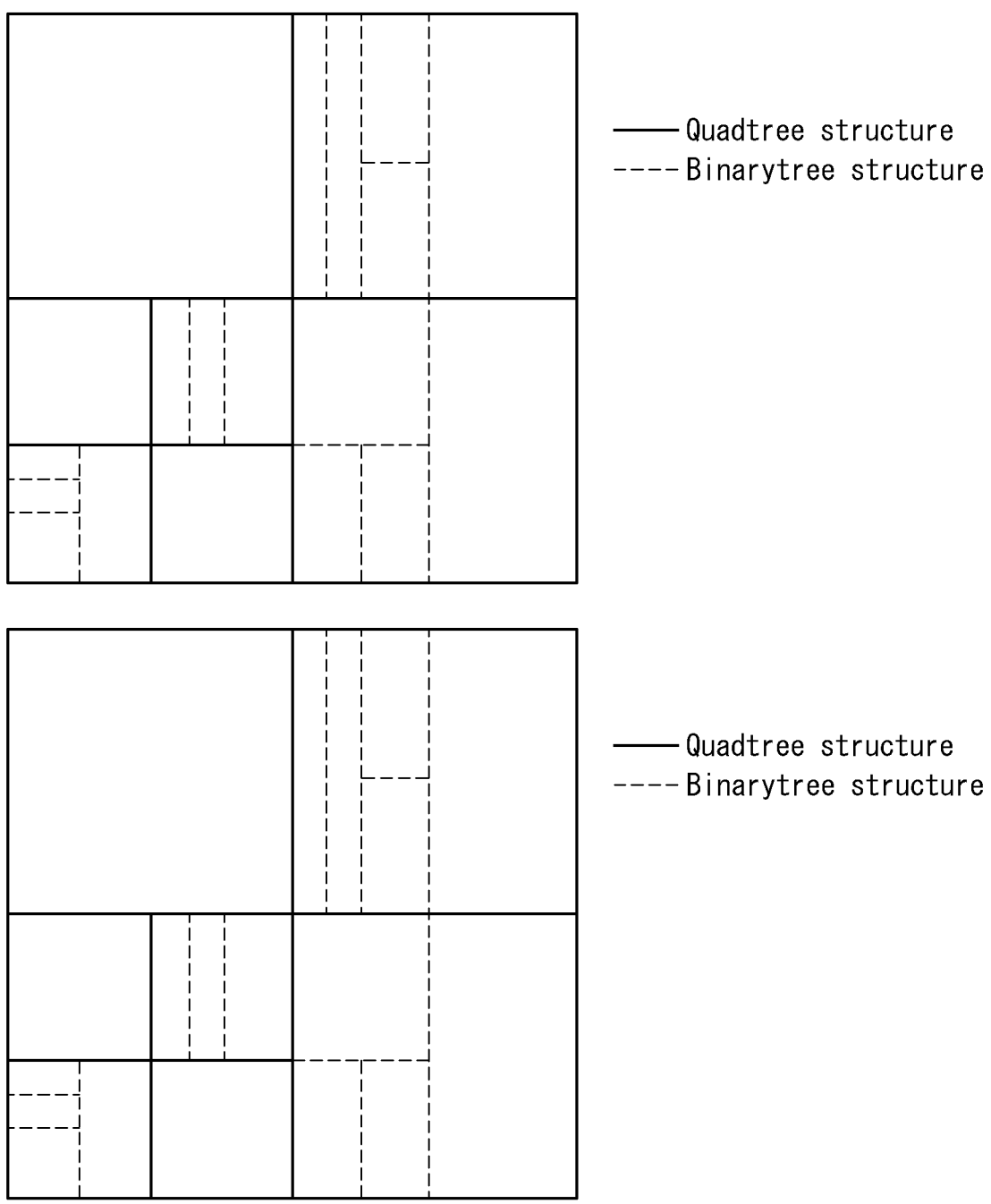

[FIG. 4]
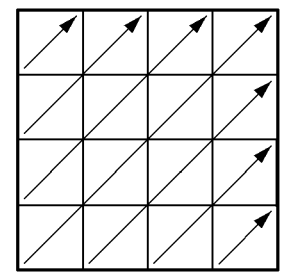
(a) Input data P     (b) Index assignment     (c) Partition set Ω

[FIG. 5]
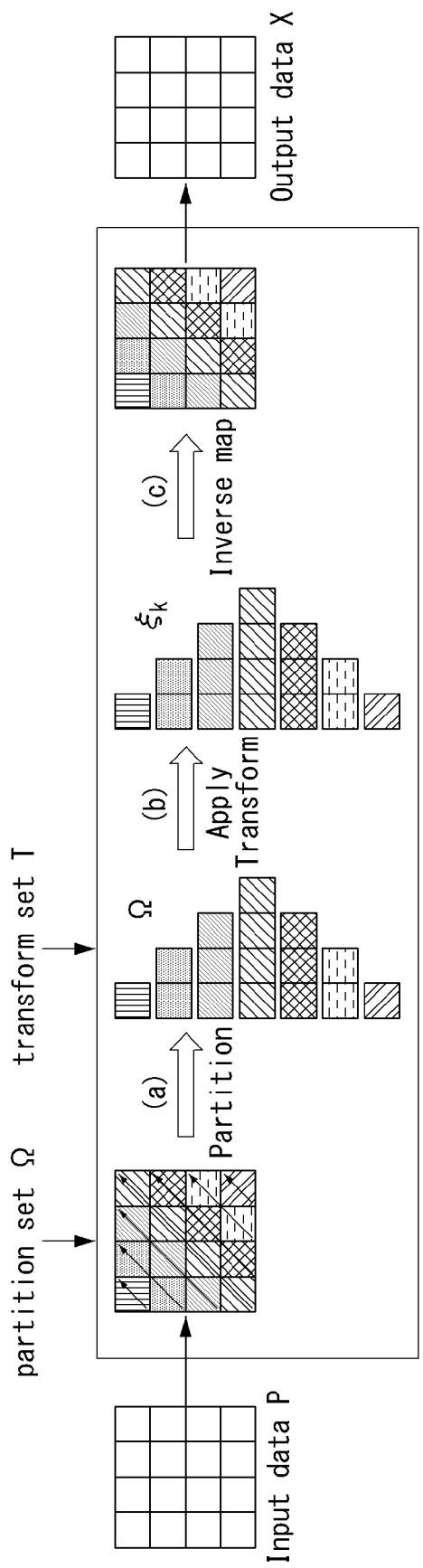

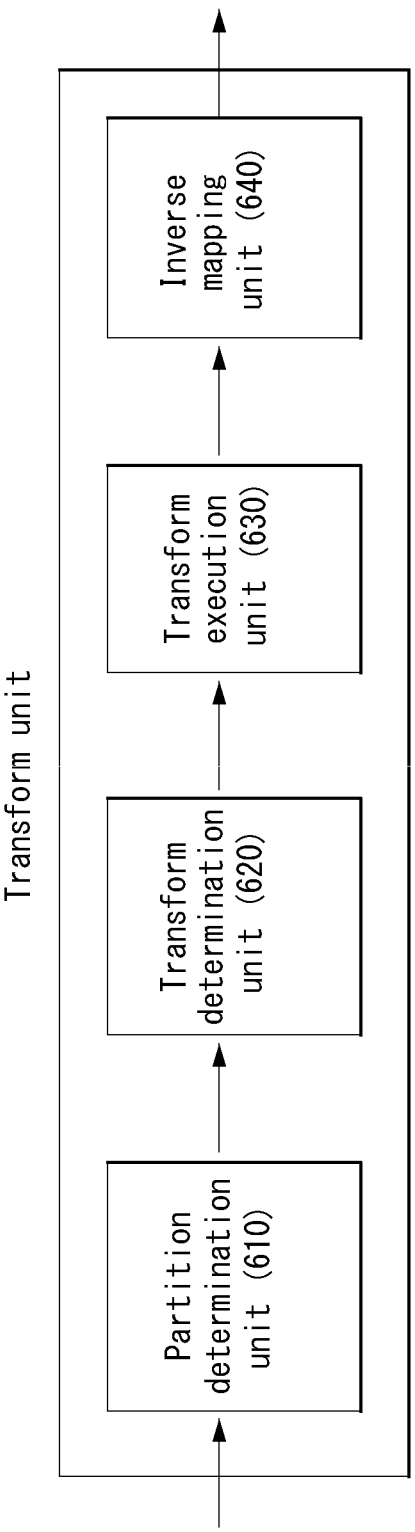
[FIG. 6]

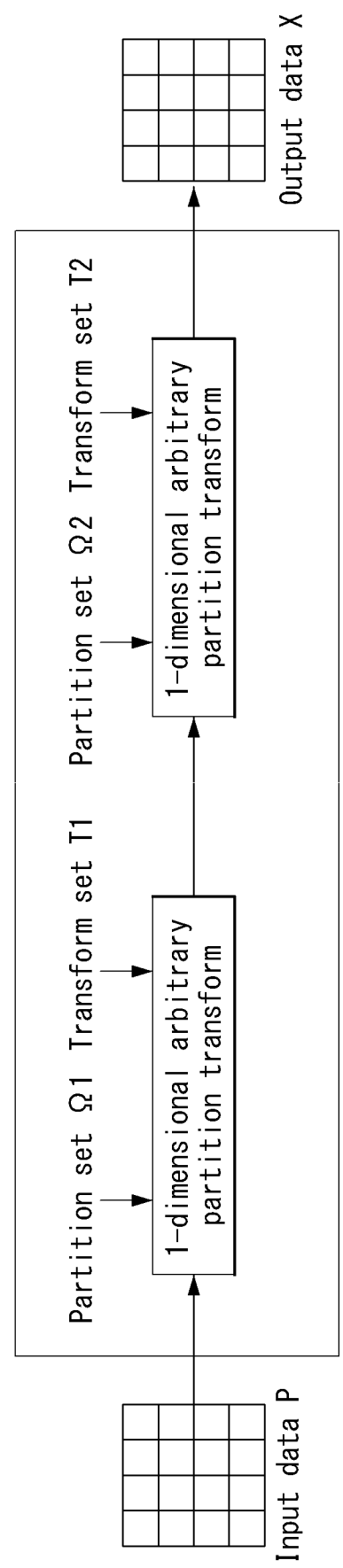
[FIG. 7]

[FIG. 8]
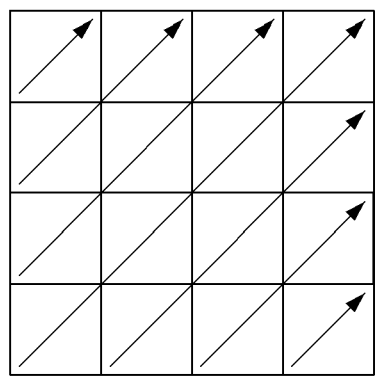
(a) partition set Ω1
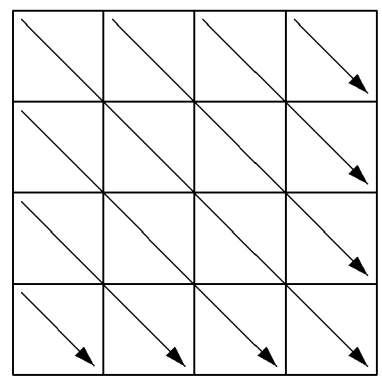
(b) partition set Ω2
[FIG. 9]
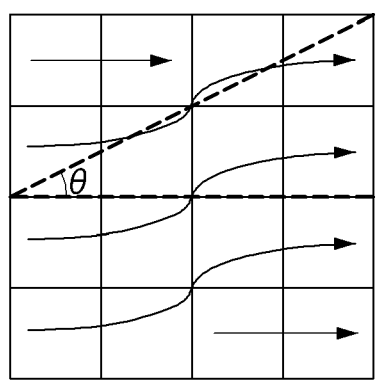
(a) partition set Ω1
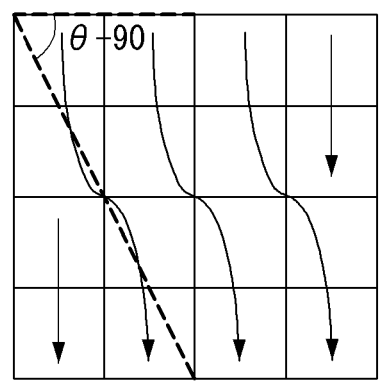
(b) partition set Ω2

[FIG. 10]
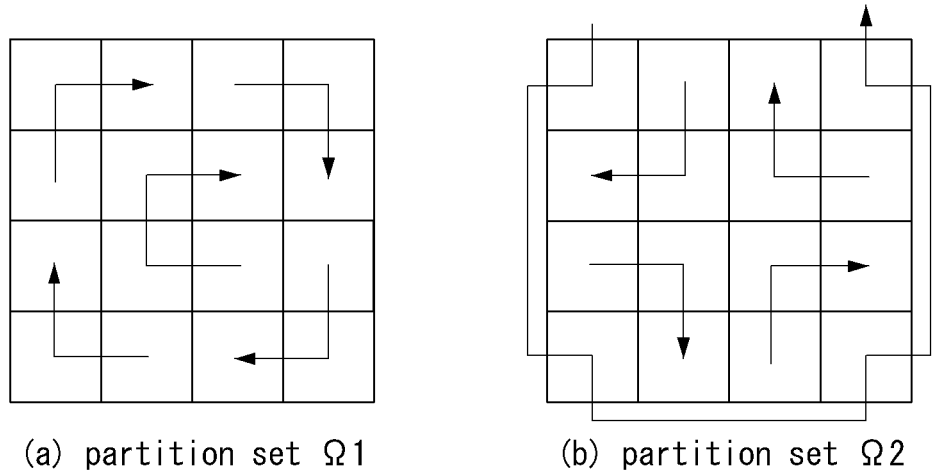
(a) partition set Ω1          (b) partition set Ω2
[FIG. 11]
| $\omega_1^1$ | $\omega_2^2$ | $\omega_3^4$ | $\omega_2^1$ |
|---|---|---|---|
| $\omega_3^3$ | $\omega_4^1$ | $\omega_1^2$ | $\omega_4^4$ |
| $\omega_2^3$ | $\omega_4^2$ | $\omega_3^2$ | $\omega_4^3$ |
| $\omega_3^1$ | $\omega_1^3$ | $\omega_1^4$ | $\omega_2^4$ |
Partition set Ω

[FIG. 12]
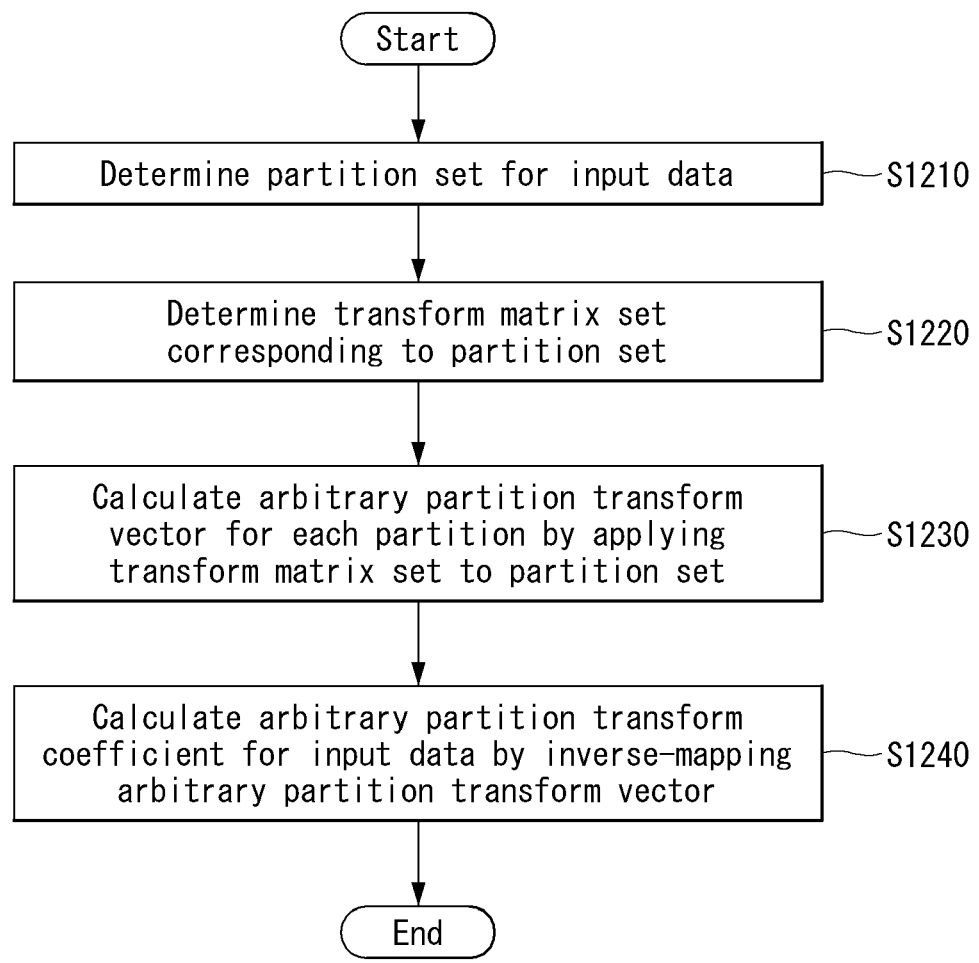

[FIG. 13]
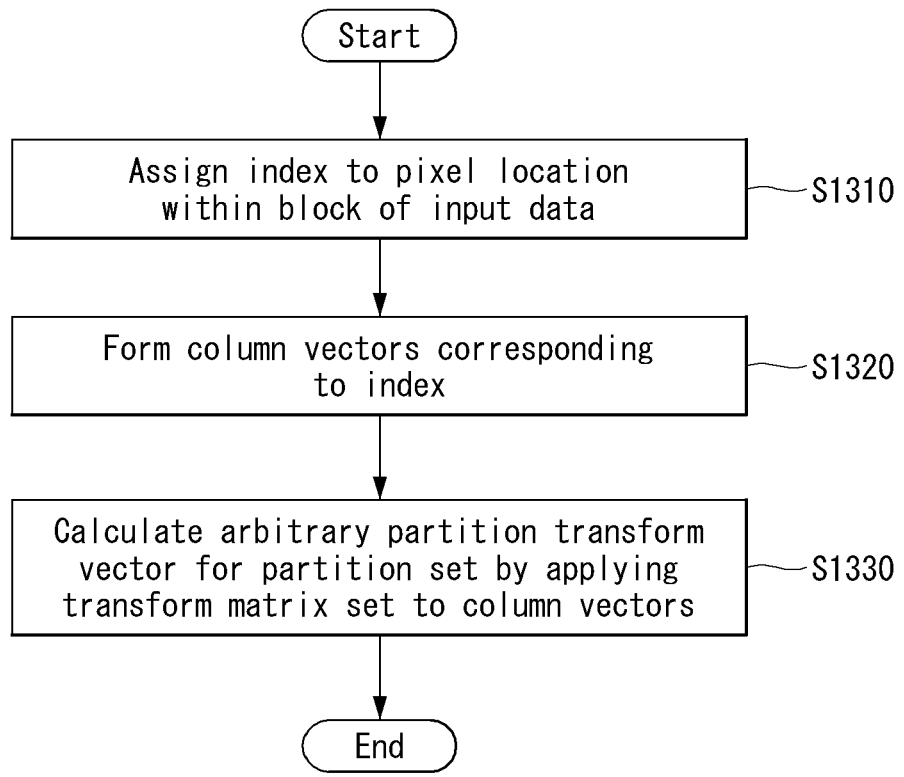

[FIG. 14]
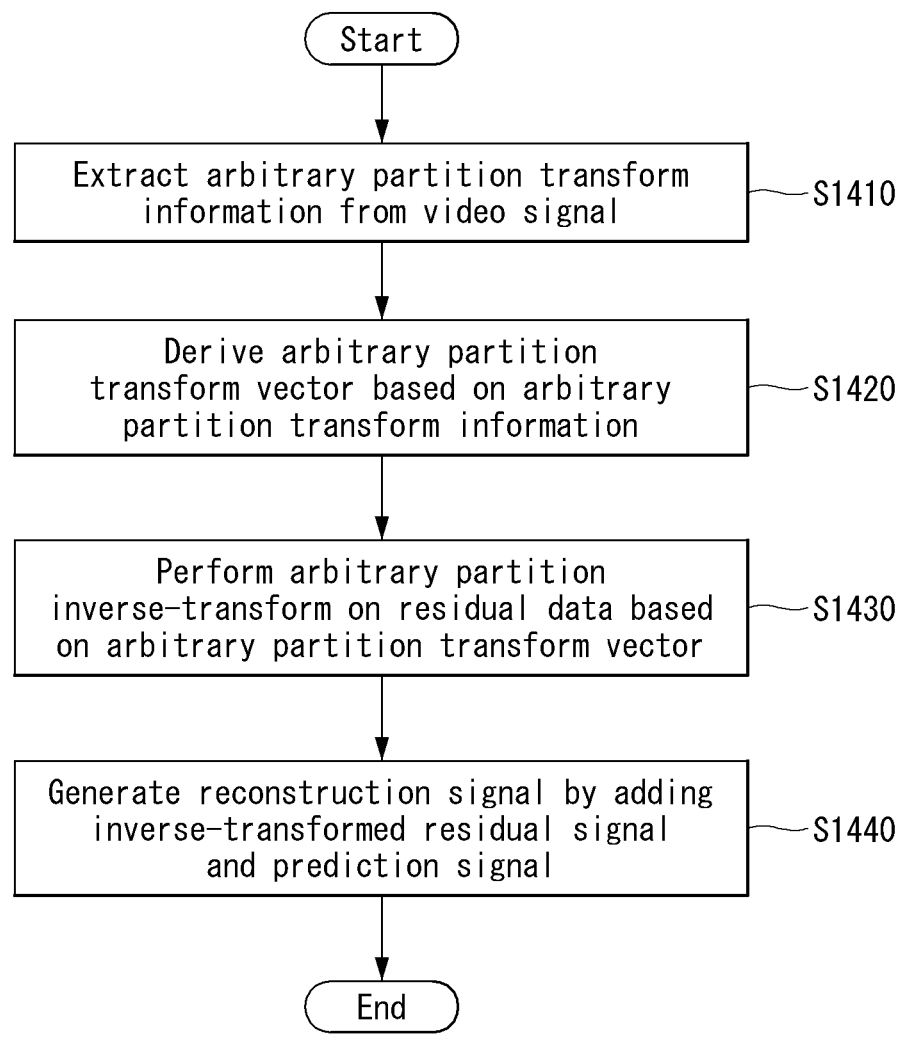

[FIG. 15]
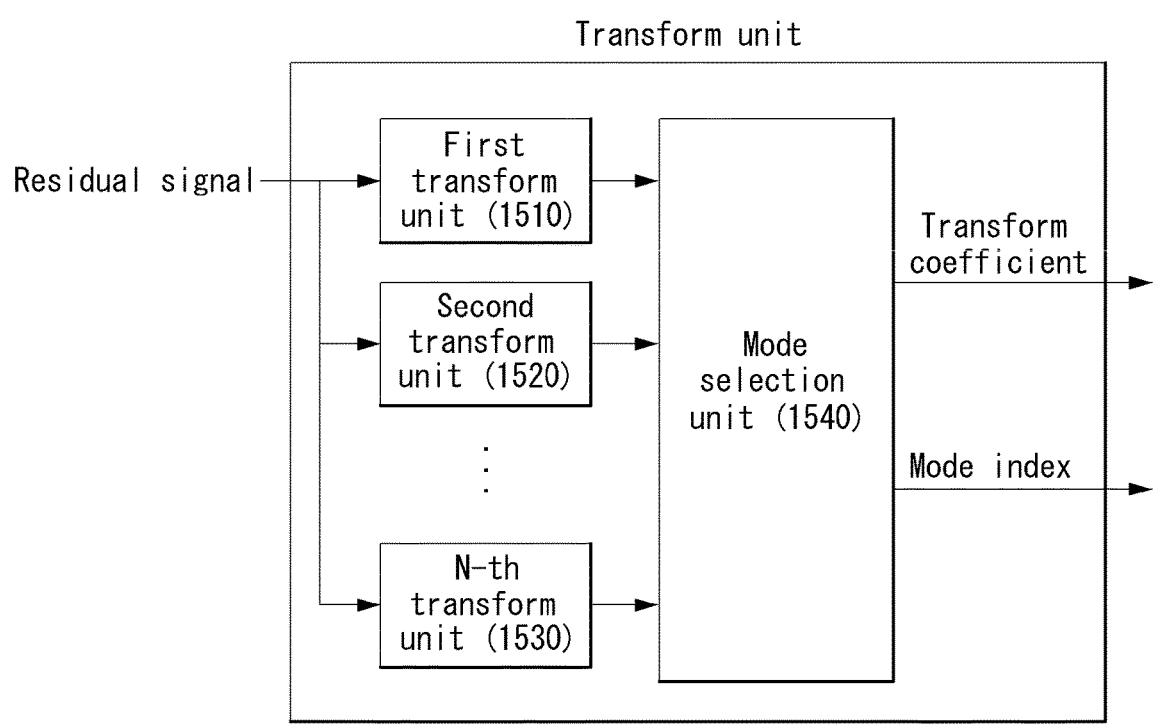

METHOD FOR PROCESSING VIDEO SIGNAL ON BASIS OF ARBITRARY PARTITION TRANSFORM

CROSS-REFERENCE TO RELATED APPLICATIONS

This application is a National Stage application under 35 U.S.C. § 371 of International Application No. PCT/KR2017/004949, filed on May 12, 2017, which claims the benefit of U.S. Provisional Application No. 62/335,621, filed on May 12, 2016. The disclosures of the prior applications are incorporated by reference in their entirety.

TECHNICAL FIELD

The present invention relates to a method of processing a video signal based on an arbitrary partition transform and, particularly, to a technology for designing transform for partitions arbitrarily split from a data block.

BACKGROUND ART

Next-generation video content will have features of high spatial resolution, a high frame rate, and high dimensionality of scene representation. Processing such content will result in a tremendous increase in terms of memory storage, a memory access rate, and processing power. Therefore, there is a need to design a coding tool for processing next-generation video content more efficiently.

In general, in the case of data of N×N blocks, multiply-add operations of $N^4$ are necessary in order to apply two-dimensional transform. In contrast, separable transform commonly has complexity of about $N^3$, but has low performance in an application program, such as signal compression, compared to non-separable transform.

Accordingly, there is a need for a method capable of satisfying requirements between low complexity and high compression efficiency for effective signal processing.

DISCLOSURE

Technical Problem

The present invention is to provide a method of processing a video signal based on an arbitrary partition transform.

Furthermore, the present invention is to provide a method of defining transform for partitions arbitrarily split from a data block.

Furthermore, the present invention is to provide a method of approximating non-separable multi-dimensional transform using one-dimensional transform.

Furthermore, the present invention is to provide a method of applying an arbitrary partition transform to a data block.

Furthermore, the present invention is to provide a method of performing a one-dimensional arbitrary partition transform and a multi-dimensional arbitrary partition transform.

Furthermore, the present invention is to provide a method of determining an optimal partition set for performing an arbitrary partition transform.

Furthermore, the present invention is to provide a method of determining an optimal transform matrix set for performing an arbitrary partition transform.

Technical Solution

The present invention provides a method of processing a video signal based on an arbitrary partition transform.

Furthermore, the present invention provides a method of performing a multi-dimensional arbitrary partition transform by successively performing a one-dimensional arbitrary partition transform.

Furthermore, the present invention provides a method of determining an optimal partition set for performing an arbitrary partition transform based on an optimization function.

Furthermore, the present invention provides a method of determining an optimal transform matrix set for performing an arbitrary partition transform based on an optimization function.

Furthermore, the present invention provides various embodiments of a scanning pattern for defining a partition set.

Furthermore, the present invention provides a method of performing arbitrary partition inverse-transform based on arbitrary partition transform information.

Advantageous Effects

The present invention can perform compression coding with low complexity and high efficiency by providing the method of performing an arbitrary partition transform.

Furthermore, the concept of the present invention can be extended to non-square blocks, multiple dimensions and data of a non-pixel type in addition to a square block, and thus can perform more adaptive transform.

Furthermore, the present invention can perform coding more efficient than the existing DCT-based coding using at least one of an optimal partition set or optimal transform matrix set determined based on an optimization function in order to perform an arbitrary partition transform.

DESCRIPTION OF DRAWINGS

FIG. 1 shows a schematic block diagram of an encoder for encoding a video signal according to one embodiment of the present invention.

FIG. 2 shows a schematic block diagram of a decoder for decoding a video signal according to one embodiment of the present invention FIG. 3 shows the partition structure of a block for the coding of a video signal as an embodiment to which the present invention is applied.

FIG. 4 is a diagram for illustrating a partition set of input data for performing an arbitrary partition transform as an embodiment to which the present invention is applied.

FIG. 5 is a diagram for illustrating a method of performing an arbitrary partition transform as an embodiment to which the present invention is applied.

FIG. 6 is a schematic block diagram of a transform unit to which an arbitrary partition transform is applied as an embodiment to which the present invention is applied.

FIG. 7 is a diagram for illustrating a method of performing a two-dimensional arbitrary partition transform as an embodiment to which the present invention is applied.

FIGS. 8 to 11 show various examples of a scanning pattern for defining a partition set as embodiments to which the present invention is applied.

FIG. 12 is a flowchart illustrating a process of performing an arbitrary partition transform as an embodiment to which the present invention is applied.

FIG. 13 is a flowchart illustrating a process of obtaining an arbitrary partition transform vector as an embodiment to which the present invention is applied.

FIG. 14 is a flowchart illustrating a process of decoding a video signal based on an arbitrary partition transform as an embodiment to which the present invention is applied.

FIG. 15 is a schematic block diagram of a transform unit for performing a transform using at least one transform method including an arbitrary partition transform as an embodiment to which the present invention is applied.

BEST MODE

The present invention provides a method of processing a video signal based on an arbitrary partition transform includes determining a partition set for input data, wherein the partition set indicates a set of partitions split from a data block based on a scanning pattern; determining a transform matrix set corresponding to the partition set; obtaining an arbitrary partition transform vector for each partition by applying the transform matrix set to the partition set; and obtaining an arbitrary partition transform coefficient for the input data by inverse-mapping the arbitrary partition transform vector.

Furthermore, in the present invention, the step of obtaining the arbitrary partition transform vector includes assigning an index to a pixel location within a block of the input data; forming a column vector corresponding to the index; and obtaining the arbitrary partition transform vector for the partition set by applying the transform matrix set to the column vector.

Furthermore, in the present invention, the index is represented as at least one index subset. The column vector is represented as at least one column vector subset. Each of the at least one index subset and the at least one column vector set is ordered based on the scanning pattern.

Furthermore, in the present invention, the scanning pattern corresponds to at least one of a diagonal pattern, an anti-diagonal pattern, an angle pattern, a corner pattern, or an arbitrary pattern.

Furthermore, in the present invention, at least one of the partition set and the transform matrix set is determined as an optimal value based on an optimization function.

Furthermore, in the present invention, a two-dimensional arbitrary partition transform is obtained by continuously performing two one-dimensional arbitrary partition transforms.

Furthermore, in the present invention, quantizing the arbitrary partition transform coefficient and entropy-encoding the quantized arbitrary partition transform coefficient.

Furthermore, the present invention provides a method of processing a video signal based on an arbitrary partition transform, including extracting arbitrary partition transform information from the video signal; deriving an arbitrary partition transform vector based on the arbitrary partition transform information; performing an arbitrary partition inverse-transform on residual data based on the arbitrary partition transform vector; and generating a reconstruction signal by adding the inverse-transformed residual signal and a prediction signal. The arbitrary partition transform information includes at least one of a partition index or a transform index. The partition index indicates an index indicating a partition set split based on a specific scanning pattern. The transform index indicates an index indicating a transform matrix set corresponding to the partition set.

Furthermore, the present invention provides an apparatus for processing a video signal based on an arbitrary partition transform, including a transform unit determining a partition set for input data, determining a transform matrix set corresponding to the partition set, obtaining an arbitrary partition transform vector for each partition by applying the transform matrix set to the partition set, and obtaining an arbitrary partition transform coefficient for the input data by inverse-mapping the arbitrary partition transform vector; a quantization unit quantizing the arbitrary partition transform coefficient; and an entropy encoding unit entropy-encoding the quantized arbitrary partition transform coefficient. The partition set indicates a set of partitions split from a data block based on a scanning pattern.

Furthermore, in the present invention, the transform unit assigns an index to a pixel location within a block of the input data, forms a column vector corresponding to the index, and obtains the arbitrary partition transform vector for the partition set by applying the transform matrix set to the column vector.

Furthermore, the present invention provides an apparatus for processing a video signal based on an arbitrary partition transform, including a parsing unit extracting arbitrary partition transform information from the video signal; an inverse transform unit deriving an arbitrary partition transform vector based on the arbitrary partition transform information and performing an arbitrary partition inverse-transform on residual data based on the arbitrary partition transform vector; and a reconstruction unit generating a reconstruction signal by adding the inverse-transformed residual signal and a prediction signal. The arbitrary partition transform information includes at least one of a partition index or a transform index. The partition index indicates an index indicating a partition set split based on a specific scanning pattern. The transform index indicates an index indicating a transform matrix set corresponding to the partition set.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Further, partitioning, decomposition, splitting, and split, etc. may also be appropriately substituted with each other for each coding process.

FIG. 1 shows a schematic block diagram of an encoder for encoding a video signal, according to one embodiment of the present invention.

Referring to FIG. 1, the encoder 100 may include an image segmentation unit 110, a transform unit 120, a quantization unit 130, a de-quantization unit 140, an inverse transform unit 150, a filtering unit 160, a decoded picture buffer (DPB) 170, an inter prediction unit 180, an intra prediction unit 185, and an entropy encoding unit 190.

The image segmentation unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal, output by the inter-prediction unit 180 or the intra-prediction unit 185, from an input video signal. The generated residual signal is transmitted to the transform unit 120.

The transform unit 120 may generate a transform coefficient by applying a transform scheme to the residual signal. The transform process may be applied to a pixel block having the same rectangle size and may be applied to a variable size block having a form other than a rectangle.

The transform unit 120 may use a graph-based signal processing method of representing inter-pixel relation information in a graph and processing it. For example, the transform unit 120 may include an arbitrary partition transform unit (not shown). The arbitrary partition transform unit may determine a partition set for input data, may determine a transform matrix set corresponding to the partition set, may obtain an arbitrary partition transform vector for each partition by applying the transform matrix set to the partition set, and may obtain an arbitrary partition transform coefficient for the input data by inverse-mapping the arbitrary partition transform vector. In this case, the partition set may indicate a set of partitions split from a data block based on a scanning pattern.

In an embodiment of the present invention, the step of obtaining the arbitrary partition transform vector may include the steps of assigning an index to a pixel location within a block of the input data; forming a column vector corresponding to the index; and obtaining the arbitrary partition transform vector for the partition set by applying the transform matrix set to the column vectors.

In an embodiment of the present invention, the index may be represented as at least one index subset. The column vector may be represented as at least one column vector subset. Each of the at least one index subset and the at least one column vector set may be ordered based on the scanning pattern.

In an embodiment of the present invention, the scanning pattern may correspond to at least one of a diagonal pattern, an anti-diagonal pattern, an angle pattern, a corner pattern, or an arbitrary pattern.

In an embodiment of the present invention, the at least one of the partition set and the transform matrix set may be determined as an optimal value based on an optimization function.

In an embodiment of the present invention, a two-dimensional arbitrary partition transform may be obtained by successively performing two one-dimensional arbitrary partition transforms.

The arbitrary partition transform unit to which the present invention is applied may be present in a separate function unit. Or, the arbitrary partition transform unit may be included in the transform unit 120 along with a functional unit performed according to a different transform method. For example, FIG. 15 to be described later may be an example, but the present invention is not limited thereto. For example, the different transform method may include at least one of a discrete cosine transform (DCT), a discrete sine transform (DST), a Karhunen-Loeve transform (KLT), a conditionally non-linear transform (CNT), an arbitrary partition transform or an oblique transform.

The quantization unit 130 may quantize the transform coefficient and transmit to the entropy encoding unit 190. The entropy encoding unit 190 may entropy-code the quantized signal and output it as a bitstream. In this case, the transform coefficient may be the arbitrary partition transform coefficient or may be a transform coefficient obtained by a different transform method.

The quantized signal output by the quantization unit 130 may be used to generate a prediction signal. For example, the quantized signal may be subjected to a de-quantization and an inverse transform via the de-quantization unit 140 and the inverse transform unit 150 in the loop respectively to reconstruct a residual signal. The reconstructed residual signal may be added to the prediction signal output by the inter prediction unit 180 or intra prediction unit 185 to generate a reconstructed signal.

Meanwhile, in the compression process, adjacent blocks may be quantized by different quantization parameters, so that deterioration of the block boundary may occur.

This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

The intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter prediction unit 180 or the intra prediction unit 185 may be used to generate the reconstructed signal or used to generate the residual signal.

FIG. 2 shows a schematic block diagram of a decoder for decoding a video signal according to one embodiment of the present invention.

Referring to FIG. 2, the decoder 200 may include a parsing unit (not shown), an entropy decoding unit 210, a de-quantization unit 220, an inverse transform unit 230, a filtering unit 240, a decoded picture buffer (DPB) 250, an inter prediction unit 260, an intra prediction unit 265 and a reconstruction unit (not shown).

A reconstructed video signal output by the decoder 200 may be reproduced using a reproducing device.

The decoder 200 may receive a bitstream and parse coding information necessary for signal reconstruction from the bitstream through a parsing unit (not shown).

The received bitstream may be entropy-decoded through the entropy decoding unit 210.

In an embodiment of the present invention, the parsing unit may extract arbitrary partition transform information from the bitstream. In this case, the arbitrary partition transform information indicates information used to perform an arbitrary partition transform. For example, the arbitrary partition transform information may include at least one of a partition index or a transform index. The partition index indicates an index indicating a partition set split based on a specific scanning pattern, and the transform index indicates an index indicating a transform matrix set corresponding to the partition set.

The arbitrary partition transform information may be used to perform an arbitrary partition inverse-transform.

In an embodiment of the present invention, the parsing unit may extract a mode index from the bitstream. In this case, the mode index may correspond to an optimized transform matrix or a transform matrix set. For example, the mode index may indicate a DCT matrix, an arbitrary partition transform matrix or a DST matrix or a combination of them.

The mode index may be entropy-decoded through the entropy decoding unit 210 and may be used for the inverse transform unit 230 to perform an inverse transform.

For example, the decoder may derive an arbitrary partition transform vector based on the arbitrary partition transform information, may perform an arbitrary partition inverse-transform on residual data based on the arbitrary partition transform vector, and may generate a reconstruction signal by adding the inverse-transformed residual signal and a prediction signal.

In one embodiment, various types of transform matrices corresponding to the mode index may be previously prepared through offline training and may have been stored in the encoder and/or the decoder. The decoder may derive a transform corresponding to the mode index among previously stored transform matrices, and may use the derived transform.

However, the present invention is not limited thereto. For example, the mode index may not be an essential element for decoding of the present invention.

The dequantization unit 220 obtains a transform coefficient from an entropy-decoded signal using quantization step size information. In this case, the transform coefficient may be the arbitrary partition transform coefficient or may be a transform coefficient obtained by a different transform method. Or, the transform coefficient may be a transform coefficient to which the various embodiments described in the transform unit 120 of FIG. 1 have been applied.

The inverse transform unit 230 obtains a residual signal by inverse-transforming the transform coefficient. For example, when the inverse transform is performed, an arbitrary partition transform method may be used.

A reconstruction signal is generated by adding the obtained residual signal to a prediction signal output by the inter-prediction unit 260 or the intra-prediction unit 265.

The filtering unit 240 applies filtering to the reconstruction signal and outputs the filtered signal to a playback device or transmits it to the decoded picture buffer unit 250. The filtered signal transmitted to the decoded picture buffer unit 250 may be used as a reference picture in the inter-prediction unit 260.

In this specification, the embodiments described in the filtering unit 160, inter-prediction unit 180 and intra-prediction unit 185 of the encoder 100 may be identically applied to the filtering unit 240, inter-prediction unit 260 and intra-prediction unit 265 of the decoder, respectively.

FIG. 3 shows the partition structure of a block for the coding of a video signal as an embodiment to which the present invention is applied.

Quadtree Plus Binarytree (QTBT) Structure

A QTBT refers to a block split structure in which a quadtree (hereinafter referred to as a "QT") method and a binarytree (hereinafter referred to as a "BT") method have been combined. In the present invention, after the QT method is applied, the BT method may be applied. Furthermore, the QT method and the BT method may be applied regardless of their sequence.

Specifically, in the QTBT block split structure, after block split is performed in a QT form as in the existing method, split is additionally performed in a BT form through signaling of split flag information.

FIG. 3 illustrates a block split structure of the QTBT structure. A block divided by a solid line indicates a QT structure, that is, a block split in a QT form.

Furthermore, a block divided by a dotted line indicates a BT structure, that is, a block split in a BT form. Additional split may be performed on the BT structure based on a block structure split in a QT form and the vice versa.

Specifically, the encoder may use at least one of a BT split flag or a split direction flag indicating a horizontal split or a vertical split for block split into the BT structure.

A QTBT block structure may include a non-square block in addition to a square block depending on the characteristics of video. Furthermore, prediction, a transform, quantization, entropy-coding, etc. may be performed based on a split block.

Meanwhile, the encoder may split one video (or picture) in a coding tree unit (CTU) unit of a square form. Furthermore, the encoder may sequentially encode the video by one CTU according to raster scan order.

The encoder may select and use the size of the CTU depending on resolution of input video or the characteristics of input video. The CTU may include a coding tree block (CTB) for a luma component and a coding tree block (CTB) for two chroma components corresponding to the CTB.

One CTU may be decomposed in a QTBT structure or a QT structure. Such decomposition of the QTBT structure or QT structure may be recursively performed.

A coding unit (CU) may mean a process of processing input video, for example, a basic unit of coding on which intra/inter prediction is performed.

Furthermore, a CU having a tree structure may be hierarchically split based on predetermined maximum depth information (or maximum level information). Furthermore, each split CU may have depth information. The depth information may include information about the size of the CU because it indicates the split number and/or degree of the CU.

Information indicating whether a corresponding CU is split with respect to one CU may be delivered to the decoder. For example, the information may be defined as a split flag and may be represented as a syntax element "split_cu_flag." The split process of a CU has been described as an example, but a QTBT structure in addition to a QT structure may be applied to the split process of a transform unit (TU), that is, a basic unit on which a transform is performed.

A TU may be hierarchically split in a QTBT structure or a QT structure from a CU to be coded.

A TU is split in a QTBT structure or a QT structure. A TU split from a CU may be split into smaller lower TUs.

Information indicating whether a corresponding TU is split with respect to one TU may be delivered to the decoder. For example, the information may be defined as a split transform flag, and may be represented as a syntax element "split_transform_flag."

As described above, a CU is a basic unit of coding on which intra-prediction or inter-prediction is performed. In order to code input video more effectively, a CU may be split in a prediction unit (PU) unit.

A PU is a basic unit that generates a prediction block. A prediction block may be differently generated in a PU unit even within one CU. A PU may be differently split in a coding mode of a CU to which a PU belongs depending on whether an intra-prediction mode is used or an inter-prediction mode is used.

FIG. 4 is a diagram for illustrating a partition set of input data for performing arbitrary partition transform as an embodiment to which the present invention is applied.

The present invention proposes a method of approximating a sophisticated and common non-separable multi-dimensional transform using a successive and simple one-dimensional transform. A proposed algorithm is described by taking a two dimension as an example, but the present invention is not limited thereto and may be extended to a multi-dimensional example.

A non-separable transform requires high complexity, but has an advantage in that it may capture the intricate characteristics of a signal. In general, in the case of data of an N×N block, in order to apply a two-dimensional transform, multiply-add operations of $N^4$ are necessary. In contrast, a separable transform commonly has complexity of about $N^3$, but has low performance in an application program, such as signal compression, compared to a non-separable transform.

Accordingly, the present invention can satisfy two requirements for low complexity and high coding efficiency by approximating two-dimensional transform into two sets of one-dimensional transforms that are applied consecutively.

For example, unlike a typical separable transform (or separable approximation of a non-separable transform), a one-dimensional transform is not applied to a specific dimension, for example, rows of an N×N block, but may be applied to a partition set in which a one-dimensional transform matrix set is applied to an arbitrary partition transform.

Hereinafter, the present invention will be described using a square block of N×N pixels. However, the present invention is not limited thereto, and may be extended to non-square blocks, multiple dimensions, and data of a non-pixel type in addition to a square block, so more adaptive transform can be performed.

In an embodiment of the present invention, in the case of an N×N block, an index may be assigned to every pixel's location and pixels may be ordered based on the indices. A set of ordered pixels may be indicated as $P=\{p_1, \ldots, p_{N^2}\}$ or a vectorized form $p=[p_1 \ldots p_{N^2}]'$. In this case, [ ]' indicates a transpose matrix. A set of indices for all pixels within one N×N block may be indicated as $I=\{1, 2, \ldots, N^2\}$.

In the present invention, a two-dimensional transform D applicable to an N×N block may be approximated by two successive arbitrary partition transforms. However, in this specification, a term "oblique transform" may be used for a case where a partition set is configured according to the scanning order of a specific angle direction, but the present invention is not limited to the term and may be interpreted as an arbitrary partition transform within the range to which the present invention is applied. That is, the oblique transform corresponds to an embodiment of the arbitrary partition transform.

For example, the oblique transform O may be defined as follows.

Definition of Oblique Transform

1. Partition set $\Omega=\{\omega_1, \ldots, \omega_K\}$

A partition set $\Omega$ of a set $I=\{\omega_1, \ldots, \omega_K\}$ WO complies with the following mathematical definition.

a. A partition set $\Omega$ does not include an empty set.

b. The union of all sets of the partition set $\Omega$ is a set I.

c. The intersection of any two distinct sets within the partition set $\Omega$ is empty.

Furthermore, a subset $\omega_k$ (k=1, . . . , K) is a totally ordered set, and the entire order may be defined through scanning order. In this case, the subset $\omega_k$ corresponds to a partition of a data block and indicates a set of the indices of a corresponding partition. The indices may be ordered according to scanning order.

2. Transform matrix set $\mathcal{T}=\{T_1, \ldots, T_K\}$

A transform matrix $T_k$ (k=1, . . . K) is applied to pixels, and the indices of the pixels are given within a subset $\omega_k$. Transform bases are given in the column of $T_k$. When the cardinality of the subset $\omega_k$ is represented as $N_k=|\omega_k|$, a transform matrix set may be written like Equation 1.

$$T_k=[t_k^1 \ldots t_k^{N_k}] \qquad \text{[Equation 1]}$$

In this case, $t^i_k$ indicates $N_k \times 1$ vector, $T_k$ is assumed to be orthonormal, but may be extended to a more general transform.

In order to obtain $X = \mathcal{O}(P, \Omega, \mathcal{T})$, to apply a one-dimensional oblique transform $\mathcal{O}(P, \Omega, \mathcal{T})$ to a pixel block P is performed according to the following steps.

Method of Performing Oblique Transform

Column vectors $\pi_k = [\pi_k^1 \ldots \pi_k^{N_k}]'$, (k=1, ... K) may be formed so that the indices of pixels configuring a vector $\pi_k$ are given in a subset $\omega_k$. That is, $\pi_k^i = p_{\omega_k^i}$, i=1, ..., $N_k$.

In order to apply a transform to the vector $\pi_k$, a resulting vector $\xi_k$, such as Equation 2, may be obtained. For example, the resulting vector may mean an arbitrary partition transform vector or an oblique transform vector.

$$\xi_k = T'_k \cdot \pi_k \quad \text{[Equation 2]}$$

In this case, $T'_k$ indicates a transpose matrix of $T_k$.

Inverse mapping may be performed on the resulting vector $\xi_k = [\xi_k^1 \ldots \xi_k^{N_k}]'$. Fr example, $X = \{x_1, \ldots, x_{N^2}\}$ or a vectorized form $x = [x_1 \ldots x_{N^2}]'$ may be formed. Accordingly, a vector $\Xi = \{\xi_1, \ldots, \xi_K\}$ corresponding to a partition set $\Omega$ may be obtained.

FIG. 4 may show a process of determining a partition set of input data for performing an arbitrary partition transform. FIG. 4(a) shows input data P of a 4×4 pixel block, FIG. 4(b) shows indices assigned to the input data P, and FIG. 4(c) shows a partition set according to scanning order.

From FIG. 4(c), the partition set split from a data block in a diagonal direction may be seen. For example, a partition set $\Omega$ may be defined based on at least one of 7 ordered subsets $\omega_k$ (k=1, ... 7), the ordering of indices within each subset, or 7 vectors $\pi_k$ (k=1, ..., 7). In this case, the ordering of indices within each subset may be ordered according to scanning order. This is represented as arrows as in FIG. 4(c).

The partition set $\Omega$ of FIG. 4(c) may be represented like Equation 3.

$$\omega_1 = \{1\}, \pi_1 = [13]'$$

$$\omega_2 = \{5,2\}, \pi_2 = [4,13]'$$

$$\omega_3 = \{9,6,3\}, \pi_3 = [5,4,14]'$$

$$\omega_4 = \{13,10,7,4\}, \pi_4 = [10,5,5,17]'$$

$$\omega_5 = \{14,11,18\}, \pi_5 = [20,6,8]'$$

$$\omega_6 = \{15,12\}, \pi_6 = [30,9]'$$

$$\omega_7 = \{16\}, \pi_7 = [40]' \quad \text{[Equation 3]}$$

FIG. 5 is a diagram for illustrating a method of performing arbitrary partition transform as an embodiment to which the present invention is applied.

First, the encoder may determine a partition set for input data P (a). For example, the encoder may determine an optimal partition set for the input data P through an optimization process. In this case, the partition set may mean a set of partitions split from a data block based on a scanning pattern.

The encoder may determine a transform matrix set corresponding to the partition set and may apply the transform matrix set to the partition set (b). For example, the encoder may determine an optimal transform matrix set for the input data P through an optimization process.

In this case, at least one of the optimal partition set or the optimal transform matrix set may be previously determined through offline training, and may have been previously stored in the encoder and/or the decoder. The encoder may derive an optimal partition set and/or a corresponding optimal transform matrix set from a previously stored partition set.

The encoder may obtain an arbitrary partition transform vector (or oblique transform vector) for each partition by applying the transform matrix set to the partition set.

Furthermore, the encoder may obtain an arbitrary partition transform coefficient for the input data by inverse-mapping the arbitrary partition transform vector (c). Accordingly, output data X may be obtained.

FIG. 6 is a schematic block diagram of a transform unit to which an arbitrary partition transform is applied as an embodiment to which the present invention is applied.

The transform unit to which the present invention is applied may include a partition determination unit 610, a transform determination unit 620, a transform execution unit 630 and an inverse mapping unit 640. In the present embodiment, the function units have been separately shown, but the present invention is not limited thereto, the function units may be combined and performed in at least one function unit.

For example, at least one of the partition determination unit 610, the transform determination unit 620, the transform execution unit 630 or the inverse mapping unit 640 may be included in an optimization unit (not shown) and performed. In this case, the optimization unit may determine an optimal partition set and an optimal transform matrix set through an optimization process, and may perform a transform based on the optimal partition set and the optimal transform matrix set.

The partition determination unit 610 may determine a partition set for input data.

In this case, the partition set indicates a set of partitions split from a data block based on a scanning pattern.

In one embodiment, the scanning pattern may include at least one of a diagonal pattern, an anti-diagonal pattern, an angle pattern, a corner pattern or an arbitrary pattern. This is described more specifically in FIGS. 8 to 11.

The transform determination unit 620 may determine a transform matrix set corresponding to the partition set.

In one embodiment, at least one of the partition set and the transform matrix set may be determined as an optimal value based on the optimization function.

The transform execution unit 630 may obtain an arbitrary partition transform vector for each partition by applying the transform matrix set to the partition set. In this case, the arbitrary partition transform vector for each partition may be obtained through the following process.

First, the encoder may assign an index to a pixel location within a block of input data and form a column vector corresponding to the index. Furthermore, an arbitrary partition transform vector for each partition may be obtained by applying a transform matrix set to the column vector.

In this case, the index may be represented as at least one index subset, and the column vector may be represented as at least one column vector subset. Each of the at least one index subset and the at least one column vector set may be ordered based on a scanning pattern.

The inverse mapping unit 640 may obtain an arbitrary partition transform coefficient for the input data by inverse-mapping the arbitrary partition transform vector.

Thereafter, the encoder may quantize the arbitrary partition transform coefficient and may entropy-encode the quantized arbitrary partition transform coefficient.

FIG. 7 is a diagram for illustrating a method of performing a two-dimensional arbitrary partition transform as an embodiment to which the present invention is applied.

In an embodiment of the present invention, a two-dimensional arbitrary partition transform (or two-dimensional oblique transform) may be defined by the successive execution of two one-dimensional arbitrary partition transforms (or oblique transforms) as in FIG. 7.

The present invention proposes that a two-dimensional transform D is approximated by two successive one-dimensional oblique transform transforms. In this case, the two-dimensional transform D may mean a generally non-separable sophisticated transform.

If the two-dimensional transform matrix D is applied to a vector $p=[p_1 \ldots p_{N^2}]'$, a desired resulting vector y is given like Equation 4.

$$y=D'p=[y_1 \ldots y_{N^2}]'. \quad \text{[Equation 4]}$$

The desired resulting vector y may be approximated by x. In this case, x may be obtained like Equation 5 based on two successive one-dimensional arbitrary partition transforms (or oblique transforms) $\mathcal{T}_1(P, \Omega_1, \mathcal{T}_1)$ and $\mathcal{O}(P, \Omega_2, \mathcal{T}_2)$.

$$x = \mathcal{O}(\mathcal{O}(P,\Omega_1,\mathcal{T}_1),\Omega_2,\mathcal{T}_2) \quad \text{[Equation 5]}$$

It is evident that an arbitrary partition transform matrix O may be generated from the expression of the arbitrary partition transforms. Accordingly, when the arbitrary partition transform matrix O is applied to data p, x may be obtained by Equation 6.

$$x = \mathcal{O}(\mathcal{O}(P,\Omega_1,\mathcal{T}_1),\Omega_2,\mathcal{T}_2)=O'p. \quad \text{[Equation 6]}$$

In this case, the arbitrary partition transform matrix O may be defined by 4-tuples $(\Omega_1, \mathcal{T}_1, \Omega_2, \mathcal{T}_2)$ like Equation 7.

$$O=O(\Omega_1,\mathcal{T}_1,\Omega_2,\mathcal{T}_2). \quad \text{[Equation 7]}$$

In an embodiment of the present invention, as in Equation 8, two optimal arbitrary partition transform matrices $\mathcal{O}(., \Omega_1^*, \mathcal{T}_1^*)$ and $\mathcal{O}(., \Omega_2^*, \mathcal{T}_2^*)$ may be obtained by approximating a desired transform matrix D using the arbitrary partition transform matrix O.

$$(\Omega_1^*, \mathcal{T}_1^*, \Omega_2^*, \mathcal{T}_2^*) = \operatorname*{argmin}_{\Omega_1,\mathcal{T}_1,\Omega_2,\mathcal{T}_2} \|D - O(\Omega_1, \mathcal{T}_1, \Omega_2, \mathcal{T}_2)\|_2^2 \quad \text{[Equation 8]}$$

In an embodiment of the present invention, when a collection of input blocks $P_i$ (i=1, . . . , L), the desired transform matrix D, and an optimal transform matrix sets $\mathcal{T}_1^*$ and $\mathcal{T}_2^*$ are given, optimal partition sets $\Omega_1$ and $\Omega_2$ satisfying Equation 9 may be determined.

$$(\Omega_1, \Omega_2) = \operatorname*{argmin}_{\Omega_1,\Omega_2} \sum_{i=1}^{L} \|y_i - O(O(P_i, \Omega_1, \mathcal{T}_1^*), \Omega_2, \mathcal{T}_2^*)\|_2^2 \quad \text{[Equation 9]}$$

In another embodiment of the present invention, when a collection of input blocks $P_i$ (i=1, . . . , L), a desired transform matrix D, and optimal partition sets $\Omega_1^*, \Omega_2^*$ are given, optimal transform matrix sets $\mathcal{T}_1$ and $\mathcal{T}_2$ satisfying Equation 10 may be determined.

$$(\mathcal{T}_1, \mathcal{T}_2) = \operatorname*{argmin}_{\mathcal{T}_1,\mathcal{T}_2} \sum_{i=1}^{L} \|y_i - O(O(P_i, \Omega_1^*, \mathcal{T}_1), \Omega_2^*, \mathcal{T}_2)\|_2^2 \quad \text{[Equation 10]}$$

In another embodiment of the present invention, when a collection of input blocks $P_i$ (i=1, . . . , L) and a desired transform matrix D are given, optimal partition sets $\Omega_1$ and $\Omega_2$ and optimal transform matrix sets $\mathcal{T}_1$ and $\mathcal{T}_2$ satisfying Equation 11 may be determined.

$$(\Omega_1^*, \mathcal{T}_1^*, \Omega_2^*, \mathcal{T}_2^*) = \operatorname*{argmin}_{\Omega_1,\mathcal{T}_1,\Omega_2,\mathcal{T}_2} \sum_{i=1}^{L} \|y_i - O(O(P_i, \Omega_1, \mathcal{T}_1), \Omega_2, \mathcal{T}_2)\|_2^2 \quad \text{[Equation 11]}$$

In another embodiment of the present invention, in order to perform an optimal transform, M (M=1, 2, 3, . . . ) arbitrary partition transforms or arbitrary partition transform sets may be used.

In another embodiment of the present invention, in order to perform an optimal transform, (M−1) arbitrary partition transforms or arbitrary partition transform sets may be used. An M-th arbitrary partition transform or arbitrary partition transform set may use $\mathcal{T}_M$ comprised only of permutation matrices. In this case, the permutation matrix may mean a matrix obtained by permuting rows of identity matrices.

In this case, the M-th arbitrary partition transform permutes output coefficients obtained using (M−1) arbitrary partition transforms, thereby being capable of further minimizing Equations 8 to 11.

FIGS. 8 to 11 show various examples of a scanning pattern for defining a partition set as embodiments to which the present invention is applied.

FIG. 8 shows a diagonal pattern and an anti-diagonal pattern, FIG. 9 shows an angle pattern, FIG. 10 shows a corner pattern, and FIG. 11 shows an arbitrary pattern.

In an embodiment of the present invention, two partition sets $\Omega_1$ and $\Omega_2$ for a two-dimensional arbitrary partition transform may be defined based on a diagonal pattern and an anti-diagonal pattern like FIGS. 8(*a*) and 8(*b*).

In the case of the partition set of FIG. 8(*a*), the pixels of a data block may be scanned in diagonally. In the case of the partition set of FIG. 8(*b*), the pixels of a data block may be scanned anti-diagonally.

In an embodiment of the present invention, two partition sets $\Omega_1$ and, $\Omega_2$ for a two-dimensional arbitrary partition transform may be defined based on an angle pattern like FIGS. 9(*a*) and 9(*b*).

In the case of the partition set of FIG. 9(*a*), the pixels of a data block may be scanned in a θ angle direction. In the case of the partition set of FIG. 9(*b*), the pixels of a data block may be scanned in a (θ-90) angle direction.

In an embodiment of the present invention, two partition sets $\Omega_1$ and $\Omega_2$ for a two-dimensional arbitrary partition transform may be defined based on a corner pattern like FIGS. 10(*a*) and 10(*b*).

In the case of the partition set of FIG. 10(*a*), the pixels of a data block may be scanned form an outer corner to a center direction. For example, the pixels may be scanned in a corner center direction starting from a left-top corner pixel. However, the present invention is not limited thereto, and another corner pixel may become the start point of the data block.

In the case of the partition set of FIG. 10(*b*), the pixels of a data block may be divided into corner pixels and other pixels and may be scanned. For example, the corner pixels may be first scanned in order of left-top, left-bottom, right-bottom and right-top, and the pixels of the remaining parts may be scanned in the same order. However, the present invention is not limited thereto, and a different corner pixel or different remaining part may become the start point of the data block.

In an embodiment of the present invention, a partition set Ω for a two-dimensional arbitrary partition transform may be defined based on an arbitrary pattern like FIG. 11. For example, referring to FIG. 11, the partition set may be randomly defined by four partitions $\{w_1^k, w_2^k, w_3^k, w_4^k\}$ (k=1, 2, 3, 4).

For another example, the arbitrary pattern may be determined through an optimization process within the encoder or may be previously determined through offline training depending on video characteristics.

In another embodiment of the present invention, the arbitrary pattern may be obtained by permuting input data p through an arbitrary partition transform.

FIG. 12 is a flowchart illustrating a process of performing an arbitrary partition transform as an embodiment to which the present invention is applied.

The encoder may determine a partition set for input data (S1210). In this case, the partition set indicates a set of partitions split from a data block based on a scanning pattern. In this case, the embodiments described in FIGS. 8 to 11 may be applied to the scanning pattern. For example, the scanning pattern may include at least one of a diagonal pattern, an anti-diagonal pattern, an angle pattern, a corner pattern, or an arbitrary pattern.

The encoder may determine a transform matrix set corresponding to the partition set (S1220). In one embodiment, at least one of the partition set and the transform matrix set may be determined as an optimal value based on an optimization function. For example, in order to determine the optimal partition set and/or the optimal transform matrix set, Equations 8 to 11 may be used.

The encoder may obtain an arbitrary partition transform vector for each partition by applying the transform matrix set to the partition set (S1230). In this case, the process of obtaining the arbitrary partition transform vector for each partition is described more specifically in FIG. 13.

Furthermore, the encoder may obtain an arbitrary partition transform coefficient for the input data by inverse-mapping the arbitrary partition transform vector (S1240).

Thereafter, the encoder may quantize the arbitrary partition transform coefficient and entropy-encode the quantized arbitrary partition transform coefficient.

FIG. 13 is a flowchart illustrating a process of obtaining a arbitrary partition transform vector as an embodiment to which the present invention is applied.

First, the encoder may assign an index to a pixel location within a block of input data (S1310). For example, the index may be assigned like FIG. 4(b).

The encoder may form column vectors corresponding to the index (S1320).

In this case, the index may be represented as at least one index subset, and the column vector may be represented as at least one column vector subset. Each of the at least one index subset and the at least one column vector set may be ordered based on a scanning pattern. In this case, the embodiments described in this specification may be applied to the scanning pattern like FIGS. 8 to 11.

Furthermore, the encoder may obtain an arbitrary partition transform vector for the partition set by applying the transform matrix set to the column vectors (S1330). For example, the arbitrary partition transform vector for the partition set may be obtained based on Equation 2.

FIG. 14 is a flowchart illustrating a process of decoding a video signal based on an arbitrary partition transform as an embodiment to which the present invention is applied.

The decoder may extract arbitrary partition transform information from a video signal (S1410).

In this case, the arbitrary partition transform information indicates information used to perform an arbitrary partition transform. For example, the arbitrary partition transform information may include at least one of a partition index or a transform index. Furthermore, the partition index indicates an index indicating a partition set split based on a specific scanning pattern, and the transform index indicates an index indicating a transform matrix set corresponding to the partition set.

The decoder may derive an arbitrary partition transform vector based on the arbitrary partition transform information (S1420).

The decoder may perform an arbitrary partition inverse-transform on residual data based on the arbitrary partition transform vector (S1430).

The decoder may generate a reconstruction signal by adding the inverse-transformed residual signal and a prediction signal (S1440).

FIG. 15 is a schematic block diagram of a transform unit for performing a transform using at least one transform method including an arbitrary partition transform as an embodiment to which the present invention is applied.

The transform unit to which the present invention is applied may include a first transform unit 1510, a second transform unit 1520, an N-th transform unit 1530, and a mode selection unit 1540. In the present embodiment, the function units have been separately illustrated, but the present invention is not limited thereto. The function units may be combined and performed in at least one function unit.

For example, at least one of the first transform unit 1510, the second transform unit 1520, the N-th transform unit 1530, or the mode selection unit 1540 may be included in an optimization unit (not shown) and performed. In this case, the optimization unit may determine an optimal transform matrix through an optimization process and perform a transform based on the optimal transform matrix.

In an embodiment of the present invention, the same transform method may be applied to at least two of the first transform unit 1510, the second transform unit 1520, and the N-th transform unit 1530. In this case, when an arbitrary partition transform is applied, the embodiments described in this specification may be applied.

In another embodiment of the present invention, different transform methods may be applied to at least two of the first transform unit 1510, the second transform unit 1520, and the N-th transform unit 1530. For example, the different transform methods may include at least one of a discrete cosine transform (DCT), a discrete sine transform (DST), a Karhunen-Loeve transform (KLT), a conditionally non-linear transform (CNT), an arbitrary partition transform, or an oblique transform.

The mode selection unit 1540 may select or determine one transform method by comparing the rate-distortion (RD) costs of transform coefficients output by the first transform unit 1510, the second transform unit 1520, and the N-th transform unit 1530. For example, when the RD cost of an arbitrary partition transform coefficient is smaller than a DCT coefficient, the mode selection unit 1540 may select a mode index corresponding to the arbitrary partition transform coefficient.

In this case, the mode index may be included in the above-described arbitrary partition transform information. For example, the mode index may include at least one of a partition index or a transform index. As a detailed example, when the mode index indicates an arbitrary partition transform matrix set, the decoder may derive an arbitrary partition transform matrix set corresponding to the mode index.

The embodiments in this specification are described mainly on the basis of an encoder, but the present invention is not limited thereto. Each function unit in a transform unit may be implemented even in a decoder as well as the encoder, and, in this case, all function units in the transform unit described with reference to the above embodiments are not necessarily included in the decoder: some of them may be included in the decoder or information stored in the outside or predefined information in the encoder/decoder may be used.

As described above, the embodiments explained in the present invention may be implemented and performed in a processor, a micro-processor, a controller or a chip. For example, the functional modules explained in FIGS. 1, 2 5 to 7 and 15 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus, and may be used to code video signals and data signals.

Furthermore, the decoding/encoding method to which the present invention is applied may be produced in the form of a program to be executed by a computer, and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a blue ray disk (BD), a USB, ROM, RAM, CD-ROM, a magnetic tape, a floppy disk, and an optical data storage device, for example. Furthermore, the computer-readable recording median includes media implemented in the form of carrier waves (e.g., transmission through the Internet). Furthermore, a bit stream generated by the encoding method may be stored in a computer-readable recording medium or may be transmitted over a wired/wireless communication network.

INDUSTRIAL APPLICABILITY

The exemplary embodiments of the present invention have been disclosed for illustrative purposes, and those skilled in the art may improve, change, replace or add various other embodiments within the technical spirit and scope of the present invention disclosed in the attached claims.

The invention claimed is:

1. A method of processing a video signal based on an arbitrary partition transform, comprising:
determining a partition set for a two-dimensional data block, wherein the partition set indicates a set of one-dimensional partitions split from the two-dimensional data block based on a scanning pattern;
determining a transform matrix set corresponding to the partition set, wherein a two-dimensional arbitrary partition transform of the transform matrix set is defined as successive execution of two one-dimensional arbitrary partition transforms;
obtaining an arbitrary partition transform vector for each one-dimensional partition by successively applying the two one-dimensional arbitrary partition transforms to the one-dimensional partition;
obtaining arbitrary partition transform coefficients for the two-dimensional data block by inverse-mapping arbitrary partition transform vectors for respective one-dimensional partitions;
quantizing the arbitrary partition transform coefficients; and
entropy-encoding the quantized arbitrary partition transform coefficients.

2. The method of claim 1,
wherein a step of obtaining the arbitrary partition transform vector comprises:
assigning an index to a pixel location within the two-dimensional data block;
forming a column vector corresponding to the index; and
obtaining the arbitrary partition transform vector for the one-dimensional partition by successively applying the two one-dimensional arbitrary partition transforms to the column vector.

3. The method of claim 2,
wherein the index is represented as at least one index subset,
wherein the column vector is represented as at least one column vector subset, and
wherein each of the at least one index subset and the at least one column vector set is ordered based on the scanning pattern.

4. The method of claim 3,
wherein the scanning pattern corresponds to at least one of a diagonal pattern, an anti-diagonal pattern, an angle pattern, a corner pattern, or an arbitrary pattern.

5. The method of claim 1,
wherein at least one of the partition set and the transform matrix set is determined as an optimal value based on an optimization function.

6. A method of processing a video signal based on an arbitrary partition transform, comprising:
extracting arbitrary partition transform information from the video signal;
deriving an arbitrary partition transform vector based on the arbitrary partition transform information;
performing an entropy-decoding on the video signal;
performing a dequantization on the entropy-decoded video signal to obtain dequantized residual data;
performing an arbitrary partition inverse-transform on the dequantized residual data based on the arbitrary partition transform vector; and
generating a reconstruction signal by adding the inverse-transformed residual signal and a prediction signal,
wherein the arbitrary partition transform information includes at least one of a partition index or a transform index,
wherein the partition index indicates an index indicating a partition set split based on a specific scanning pattern, wherein the transform index indicates an index indicating a transform matrix set corresponding to the partition set, wherein a two-dimensional arbitrary partition transform of the transform matrix set is defined by two one-dimensional arbitrary partition transforms, and wherein performing the arbitrary partition inverse-transform comprises:

successively applying the two one-dimensional arbitrary partition transforms to the dequantized residual data based on the arbitrary partition transform vector, and mapping the successively transformed residual data to obtain the inverse-transformed residual signal.

7. The method of claim 6, wherein the specific scanning pattern corresponds to at least one of a diagonal pattern, an anti-diagonal pattern, an angle pattern, a corner pattern, or an arbitrary pattern.

8. The method of claim 6, wherein at least one of the partition set and the transform matrix set is determined as an optimal value based on an optimization function.

9. An apparatus for processing a video signal based on arbitrary partition transform, comprising:

a transform unit determining a partition set for a two-dimensional data block, determining a transform matrix set corresponding to the partition set, obtaining an arbitrary partition transform vector for each one-dimensional partition, and obtaining arbitrary partition transform coefficients for the two-dimensional data block by inverse-mapping arbitrary partition transform vectors for respective one-dimensional partitions;

a quantization unit quantizing the arbitrary partition transform coefficients; and an entropy encoding unit entropy-encoding the quantized arbitrary partition transform coefficients, wherein the partition set indicates a set of the one-dimensional partitions split from the two-dimensional data block based on a scanning pattern, wherein a two-dimensional arbitrary partition transform of the transform matrix set is defined by two one-dimensional arbitrary partition transforms, and wherein the transform unit obtains the arbitrary partition transform vector for the one-dimensional partition by successively applying the two one-dimensional arbitrary partition transforms to the one-dimensional partition.

10. The apparatus of claim 9, wherein the transform unit assigns an index to a pixel location within the two-dimensional data block, forms a column vector corresponding to the index, and obtains the arbitrary partition transform vector for the one-dimensional partition by successively applying the two one-dimensional arbitrary partition transforms to the column vector.

11. An apparatus for processing a video signal based on arbitrary partition transform, comprising:

a parsing unit extracting arbitrary partition transform information from the video signal;

an entropy decoding unit that performs an entropy-decoding for the video signal;

a dequantization unit that performs a dequantization on the entropy-decoded video signal to obtain dequantized residual data;

an inverse transform unit deriving an arbitrary partition transform vector based on the arbitrary partition transform information and performing an arbitrary partition inverse-transform on the dequantized residual data based on the arbitrary partition transform vector; and a reconstruction unit generating a reconstruction signal by adding the inverse-transformed residual signal and a prediction signal, wherein the arbitrary partition transform information includes at least one of a partition index or a transform index, wherein the partition index indicates an index indicating a partition set split based on a specific scanning pattern, wherein the transform index indicates an index indicating a transform matrix set corresponding to the partition set, wherein a two-dimensional arbitrary partition transform of the transform matrix set is defined by two one-dimensional arbitrary partition transforms, and wherein the inverse transform unit successively applies the two one-dimensional arbitrary partition transforms to the dequantized residual data based on the arbitrary partition transform vector, and maps the successively transformed residual data to obtain the inverse-transformed residual signal.

12. The apparatus of claim 11, wherein the specific scanning pattern corresponds to at least one of a diagonal pattern, an anti-diagonal pattern, an angle pattern, a corner pattern, or an arbitrary pattern, and wherein at least one of the partition set and the transform matrix set is determined as an optimal value based on an optimization function.

\* \* \* \* \*